US010043414B2

(12) United States Patent
Traylor (10) Patent No.: US 10,043,414 B2
(45) Date of Patent: Aug. 7, 2018

(54) MICROSCOPE-BASED LEARNING (71) Applicant: MICROSCOPY LEARNING SYSTEMS, LLC, Littleton, CO (US)

(72) Inventor: Matthew S. Traylor, Littleton, CO (US)

(73) Assignee: Microscopy Learning Systems, LLC, Littleton, CO (US)

( * ) Notice: Subject to any disclaimer, the term of this patent is extended or adjusted under 35 U.S.C. 154(b) by 259 days.

(21) Appl. No.: 14/771,469

(22) PCT Filed: Mar. 3, 2014

(86) PCT No.: PCT/US2014/019809
§ 371 (c)(1),
(2) Date: Aug. 28, 2015

(87) PCT Pub. No.: WO2014/149598
PCT Pub. Date: Sep. 25, 2014

(65) Prior Publication Data
US 2016/0005337 A1    Jan. 7, 2016

Related U.S. Application Data

(60) Provisional application No. 61/788,596, filed on Mar. 15, 2013.

(51) Int. Cl.
*G06F 3/0484* (2013.01)
*G09B 5/02* (2006.01)
*G09B 23/00* (2006.01)
*G02B 21/36* (2006.01)

(52) U.S. Cl.
CPC .......... *G09B 23/00* (2013.01); *G02B 21/365* (2013.01); *G06F 3/04842* (2013.01); *G09B 5/02* (2013.01)

(58) Field of Classification Search
CPC ....... G06F 3/04842; G09B 5/02; G09B 23/00; G02B 21/365
See application file for complete search history.

(56) References Cited

U.S. PATENT DOCUMENTS

| | | | |
|---|---|---|---|
| 2009/0213214 A1* | 8/2009 | Yamada | G01N 21/6458 348/80 |
| 2013/0040273 A1* | 2/2013 | Rath | G09B 23/28 434/262 |
| 2013/0040274 A1* | 2/2013 | Rath | G09B 23/30 434/272 |

* cited by examiner

*Primary Examiner* — Eric J Bycer
(74) *Attorney, Agent, or Firm* — Perkins Coie LLP (57) ABSTRACT

Systems and computer-implemented methods for microscope-based learning including providing a first menu on a GUI to allow a user to identify or view a cell category of interest on a digital slide image that is simultaneously displayed with the first menu on the GUI. The systems and methods further include providing a navigation system on the GUI to allow the user to navigate the digital slide image and select proportional x and y coordinates on the digital slide image. A second menu is also provided on the GUI to allow the user to identify a cell type for the selected proportional x and y coordinates. The systems and methods are capable of automatically determining if the cell type identified by the user matches a predetermined cell type within the x and y coordinates from a database. The systems and methods further indicate whether the identified cell type matches the predetermined cell type on the GUI and display a summary of the total matches on the GUI.

18 Claims, 4 Drawing Sheets

MICROSCOPE-BASED LEARNING

FIELD OF THE INVENTION

The disclosure is directed to microscope imaging. More particularly, the disclosure is directed to a microscope-based learning methods and systems.

BACKGROUND OF THE INVENTION

Microscope-based learning is generally based around microscope labs and textbooks. The process of microscope-based learning generally includes professors and students using dual-headed or triple-headed microscopes (i.e., microscopes with more than one set of eyepieces) in conjunction with textbooks to analyze slide images. For example, a professor or instructor may project the slide images onto a screen or distribute sample slides to each student and then ask and answer questions from the students regarding the slides. Similarly, the professor may teach the students by providing one-on-one assisted review using the multi-headed microscope.

The adaptation of charge-coupled device ("CCD") cameras mounted to microscopes helped improve the learning process by making it possible for professors to digitally show slide images to multiple students on projectors or computer screens. Using a CCD camera mounted to a microscope, the instructor could manipulate the microscope and allow students to see areas and structures on a particular slide while teaching the students how to perform basic microscope tasks related to the slide. However, the process of testing the students' understanding of the slides remained essentially unchanged. In the biological sciences, e.g., the analysis of biological specimens such as blood samples, exams still require the students to review a slide with a microscope while recording a blood differential count or morphology (structures and conditions) and submit the answers to a professor. The professor then has to check the student's results against an answer sheet. Thus, it is desirable to provide an improved method and system for microscope-based learning and testing.

BRIEF SUMMARY OF THE INVENTION

The disclosure is directed to several alternative methods and systems for microscope-based learning. It shall not limit the invention in any respect. A detailed and fully enabling disclosure is set forth in the detailed description section.

The present invention provides various advantages over prior microscope-based learning methods and systems. For example, the present invention eliminates task involved with operating a microscope such as, for example, oiling or cleaning physical slides to change magnification levels. Moreover, the present invention significantly reduces the time required to view multiple slides. Students currently wishing to view multiple slides are required to handle and interchange the slides within a microscope. In addition, the student spends time focusing the microscope for each physical slide. The present invention allows a user to view multiple slides in a short period of time at higher resolutions than may otherwise be available with lab microscopes. In addition, users are not required to visit labs to review slides. Entire classes can review slides at the same time and are not limited to the number of available microscopes. Cost related to microscopes and other necessary hardware is reduced. More importantly, the users are able to learn faster by receiving instant feedback and test results. Instructors are also able to assign homework more efficiently to students who are able to review slides at their own convenience. Users do not have to refer to textbooks or professors for answers. In addition, common medical problems associated with the focusing process of microscopes, such as motion sickness, are eliminated.

One embodiment of a computer-implemented method for microscope-based learning may include a method that provides a first menu on a graphical user interface ("GUI") to allow a user to identify a cell (such as a red or white blood cells (including white blood cell types such as neutrophil, basophil, etc.) and a corresponding cell morphology category (encompassing shape abnormalities, structures, features and cell line precursors) of interest on a digital slide image that is simultaneously displayed with the first menu on the GUI. The first menu may include various cell morphology categories such as, for example, red blood cell structures, red blood cell abnormalities structures, white blood cell structures, white blood cell abnormalities, as well as other cell morphology categories that would be apparent to a person having ordinary skill in the art. Once the cell morphology category is selected, the method may further provide a navigation system to allow the user to navigate the digital slide image and select proportional x and y coordinates on the digital slide image displayed on the GUI. The navigation system may include scroll bars or similar navigation systems that would allow a user to manipulate or pan through the digital slide image and view various sections of the digital slide image as would be apparent to a person having ordinary skill in the art.

In addition to the first menu, the method is capable of providing a second menu on the GUI to allow the user to identify a cell type for the selected proportional x and y coordinates, such as, for example, white/red blood cells. The various cell types may vary depending on the selected cell morphology category. For example, if the user selects a red blood cell shape abnormalities for the cell morphology category from the first menu then the second menu may provide for cell types such as, for example, schistocytes, acanthocytes, kerotcytes, echinocytes, eccentrocytes, spherocytes, dacrocytes, codocytes, leptocytes, stomatocytes, or torocytes. Similarly, if the user selects red blood cell structures for the cell morphology category from the first menu then the second menu may provide for cell types such as, for example, Heinz bodies, Howell-Jolly bodies, or basophilic stippling. If the user selects red blood cell features for the cell morphology category then the second menu may provide for cell types such as, for example, polychromasia, anisocytosis, or hypochromasia. If the user selects white blood cell structures for the cell morphology category then the second menu may provide for cell types such as, for example, neutrophil, band, monocyte, lymphocyte, eosinophil, basophil, or nucleated red blood cell.

After the user selects the cell type for the selected proportional x and y coordinates then the method is capable of automatically determining if the cell type identified by the user matches a predetermined cell type within the selected proportional x and y coordinates from a database. The method then signals, on the GUI, whether the identified cell type matches the predetermined cell type. The method is also capable of displaying a summary of the total cell type matches on the GUI. The method is also capable of displaying a tolling number of blood count differentials on the GUI while the user is selecting cell types. Accordingly, the method provides for an improved microscope-based learning system that allows a user to interact with a digital slide image.

Another embodiment of a computer-implemented method for microscope-based learning includes providing a first menu on a GUI to allow a user to select a cell type and corresponding cell morphology category of interest on a digital slide image and have the cell type (and corresponding cell morphology) simultaneously displayed on the GUI. The first menu may include various cell types and cell morphology categories such as, for example, red blood cell structures, red blood cell abnormalities structures, white blood cell structures, white blood cell abnormalities, as well as other cell morphology categories that would be apparent to a person having ordinary skill in the art. The method is further capable of providing a second menu on the GUI to allow the user to select a cell type corresponding to the cell morphology category.

After the user selects the cell type corresponding to the cell morphology, the method is capable of automatically displaying at least one cell on the GUI matching the selected cell type. The automatic display allows a user to efficiently view the cell type without having to manually view the identified cell type in a textbook or through a microscope on a slide. The method is further capable of providing a navigation system on the GUI to allow a user to manipulate the slide by increasing or decreasing magnification. The navigation system allows the user to view additional cells and to view previously shown cells. In addition to showing the image of the cell, the method is capable of displaying information related to the cells simultaneously on the GUI. The cell information displayed on the GUI may relate to the shape or appearance of the cell. In addition, the information may relate specifically to the cell type such as, for example, if a stomatocyte cell is shown on the GUI then the cell information may discuss the significance of the stomatocyte and what conditions are usually associated with the stomatocyte. Again, the method provides for an improved method of microscope-based learning related to cell morphology.

Another embodiment of the invention may include a system having a display screen for microscope-based learning. The display screen may be a touch-sensitive display (i.e., a touch screen) with a GUI, one or more processors, memory and one or more programs or sets of instructions stored in the memory for performing multiple functions. In some embodiments, the user may interact with the GUI primarily through finger contact or gestures on the touch screen. However, it should be understood that some of the user interfaces and related processes may be applied to other devices such as, for example, laptop computers, personal computers, which may include one or more other physical user-interface devices, such as a physical keyboard, a mouse and/or a joystick, and/or a physical click wheel.

In one embodiment, the functions may include at least one display function, detection function, navigation system function, comparison function, summary function, and information function. The display function allows the system to display a list of cell morphology categories. A detection function may then allow the system to detect a selection on the display screen from a user. In response to the selection, the display function is capable of providing a digital slide image related to the selected cell morphology category on the display screen for the user to preview. At least one navigation system function allows a user to manipulate the displayed digital slide image by increasing or decreasing magnification or by scrolling or panning to various portions of the digital slide image. The navigation system function further allows a user to focus on a particular cell of interest.

In one embodiment, the navigation system function includes creating a first virtual box of the image by obtaining a proportional top x and y coordinates and a proportional bottom x and y coordinates related to the digital slide image, and calculating pixels within the first virtual box. The number of pixels may then be adjusted, relative to magnification levels, to allow a user to view the digital slide image in focus. The navigation system function may label the coordinates as variables such as, for example, proptlx, proptly, propbrx, and propbry. The navigation system function may then allow a user to select a second virtual box at a specific magnification level within the first virtual box based on the size of the second virtual box by calculating the top left x and y coordinates and the bottom right x and y coordinates of the second virtual box. The navigation system function is capable of accomplishing the calculation by obtaining the actual image size of the second virtual box related to x and y coordinates, multiplying or dividing it by the proportional x and y coordinates of the first virtual box, and adjusting the boundary conditions depending on magnification levels. The user may then zoom in or out on various portions of the digital slide image.

The navigation system function may also provide for gallery capabilities to pan through a digital slide image. For example, the detection function may allow a user to select portions of the digital slide image. As the user selects different portions, the navigation system orientates the selected portion of the digital slide image relative to the entire digital slide image. Accordingly, specific areas and portions of the digital slide image may be extracted and displayed.

The navigation system function is capable of interacting with a comparison function that compares a user's cell type selection to a database of annotations (id tags) related to cell types and assigned to specific virtual boxes. For example, the comparison function is capable of allowing a user to select a cell type for a virtual box and have the selection checked against the database. Once checked, the display function is capable of displaying the results on the display screen. The comparison function is also capable of allowing the user to search for specific cell types and receive instance feedback regarding the user's selections.

In another embodiment, the display function is capable of providing information related specifically to the cell type such as, for example, if a stomatocyte cell is shown on the display screen then the display function is capable of showing cell information that discusses the significance of the stomatocyte and what conditions are usually associated with the stomatocyte. For example, the detection function is capable of detecting a user's selection of a specific cell type from a drop down menu and then, in response to the selection, the display function may provide an image of the cell type and information related to the cell type.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

While the invention is susceptible to various modifications and alternative forms, specifics of the invention have been shown by way of example in the drawings and will be described in detail below. It should be understood that the intention of the detailed description is not to limit aspects of the invention to the particular embodiments described. On the contrary, the invention covers all modifications, equivalents, and alternatives falling within the spirit and scope of the invention.

DETAILED DESCRIPTION OF THE INVENTION

The following defined terms disclosed in this detailed description of the invention shall apply to the invention, unless a different definition is given in the claims or elsewhere in this specification.

All numeric values are assumed to be modified by the term "about," whether or not explicitly indicated. The term "about" generally refers to a range of numbers that a person having ordinary skill in the art would consider equivalent to the recited value (i.e., having the same function or result). In addition, in many instances, the term "about" may be indicative as including numbers rounded to the nearest significant figure. The recitation of numerical ranges by endpoints includes all numbers within that range. Although some suitable dimensions, ranges, and/or values pertaining to various components, features and/or specifications are disclosed, a person having ordinary skill in the art, incited by the present disclosure, would understand that the desired dimensions, ranges and/or values may deviate from those expressly disclosed.

As used in this specification and the appended claims, the singular forms "a," "an," and "the" include the plural referents unless the content clearly dictates otherwise. As used in this specification and the claims, the term "or" is generally employed in its sense including "and/or" unless the content clearly dictates otherwise.

The following detailed description should be read with reference to the drawings in which similar elements in different drawings may be numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into additional embodiments unless clearly stated to the contrary. While the embodiments herein may be described in terms of spatial orientation, the terminology used is not intended to be limiting, but instead to provide a straightforward description of the various embodiments. The disclosure relates to microscope-based learning for blood morphology and blood cell differentials but may apply to microscope-based learning methods and systems for dental osteopathy, dermatology, biology, histology, parasitology, hematology, environmental monitoring & compliance, manufacturing quality assurance, reproductive medicine, lab technical training and other areas that would be apparent to a person having ordinary skill in the art after having read the disclosure.

In prior art microscope-based learning systems users are required to waste time handling and interchanging slides with a microscope. The present invention allows a user to view and navigate multiple slides in a short period of time at higher resolutions than may otherwise be available with lab microscopes. In addition, the present invention allows users to review and learn from slides outside of a lab environment. Entire classes can review and navigate slides at the same time and are not limited to the number of available microscopes. Moreover, cost related to microscopes and other necessary hardware is reduced. The users are also able to learn faster by automatically receiving instant feedback and test results. In addition, instructors are able to assign homework more efficiently to students who are able to review and navigate slides at their own convenience. The need to refer to textbooks or professors for answers is eliminated. Common medical problems associated with the focusing process of microscopes, such as motion sickness, are also eliminated.

Figure 1:
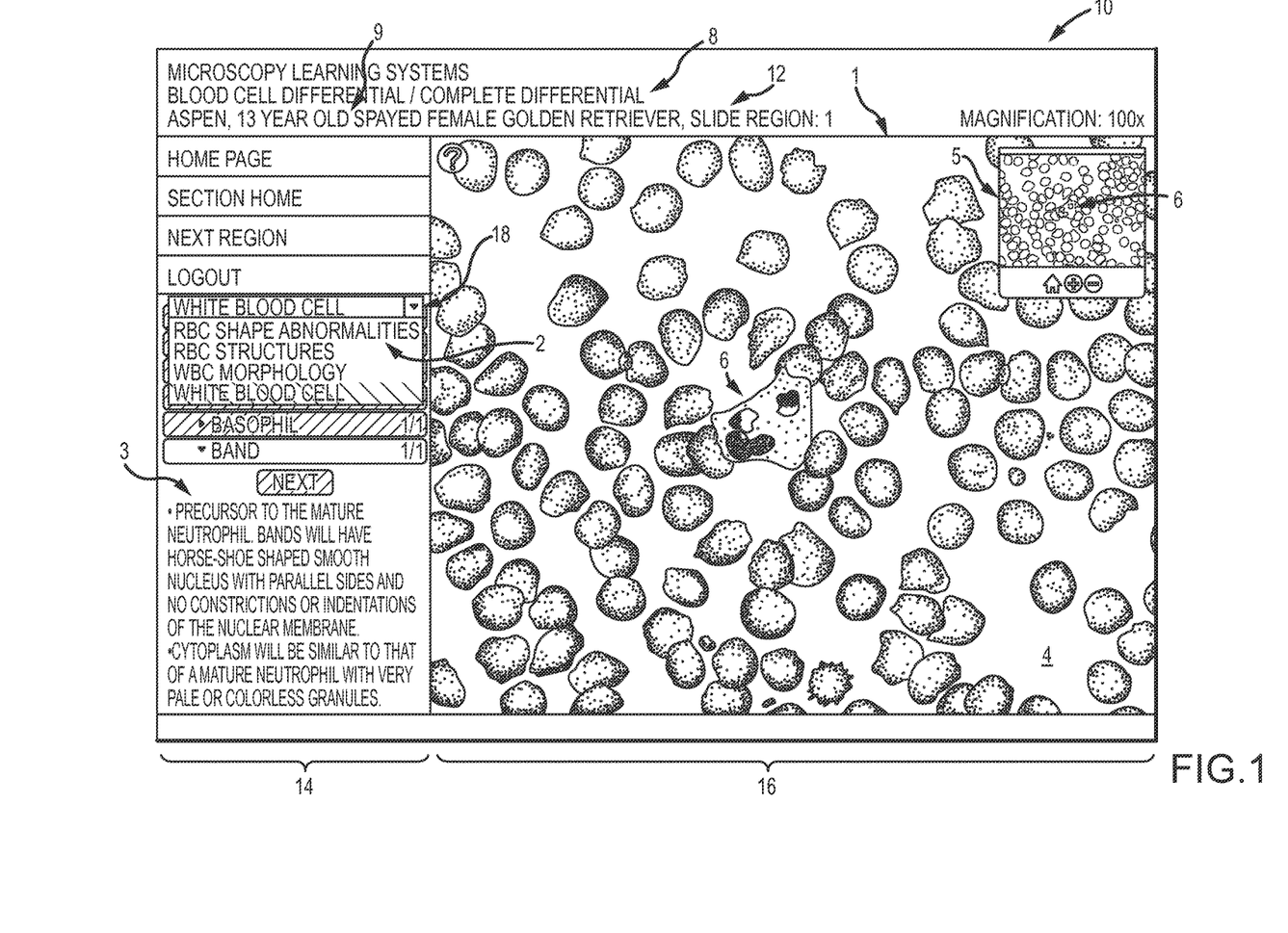
FIG. 1 is a plan view of an exemplary GUI showing a cell morphology category menu and an identified cell type.

Referring now to FIG. 1, which shows an exemplary graphical user interface ("GUI") 10 of a system (not shown) for microscope-based learning, according to one embodiment of the invention. GUI 10 may include header 1 identifying a specific learning setting 8. GUI 10 may also include slide title 9 identifying a specific digital slide image 4, as well as the slide region 12 identifying the region shown in the second portion 16 of GUI 10.

The GUI 10 may further include a first portion 14 displaying various menus, such as menu 18 showing a cell type and corresponding cell morphology categories 2. A specific cell type 6 may be annotated corresponding to the selected cell morphology category 2. The GUI 10 may also include slide menu 3 to allow a user to change between digital slide images 4. Once a user has selected a digital slide image 4, GUI 10 is capable of displaying navigation system 5 that allows a user to zoom in and out on the second portion 16 of the GUI 10 displaying the digital slide image 4. The navigation system 5 is also capable of providing users with a location relative to the entire digital slide image 4.

The microscope-based learning system may include a touch-sensitive display (i.e., a touch screen) for GUI 10, one or more processors, memory and one or more programs or sets of instructions stored in the memory for performing multiple functions. As discussed above, in some embodiments, the user may interact with GUI 10 primarily through finger contact or gestures on the touch screen. However, other user interfaces may be used with the system such as, for example, laptop computers, personal computers, which may include one or more other physical user-interface systems, such as a physical keyboard, a mouse and/or a joystick, and/or a physical click wheel.

Figure 2:
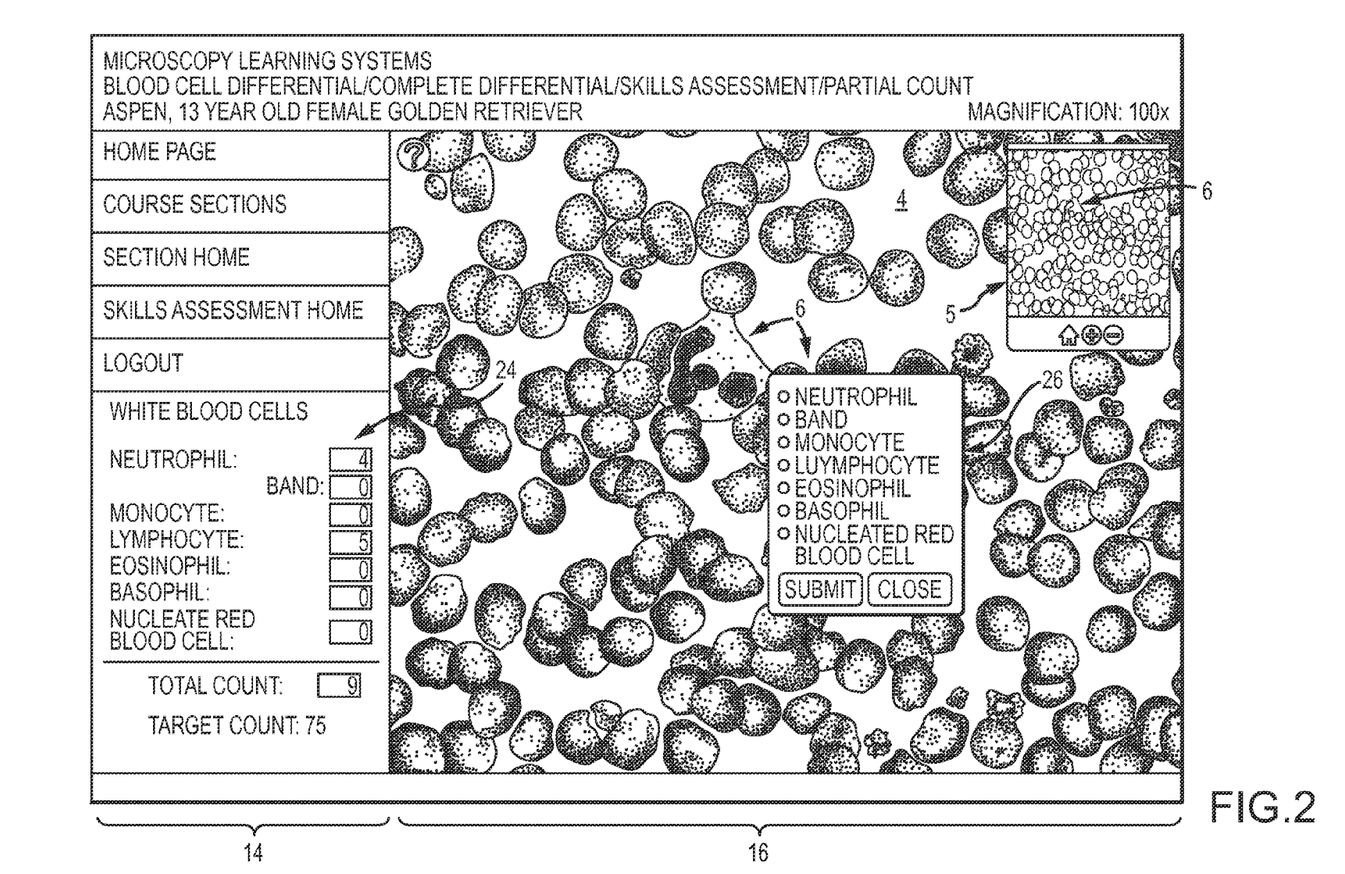
FIG. 2 is a plan view of an exemplary GUI showing a cell menu in accordance with one example embodiment of the invention.
Figure 3:
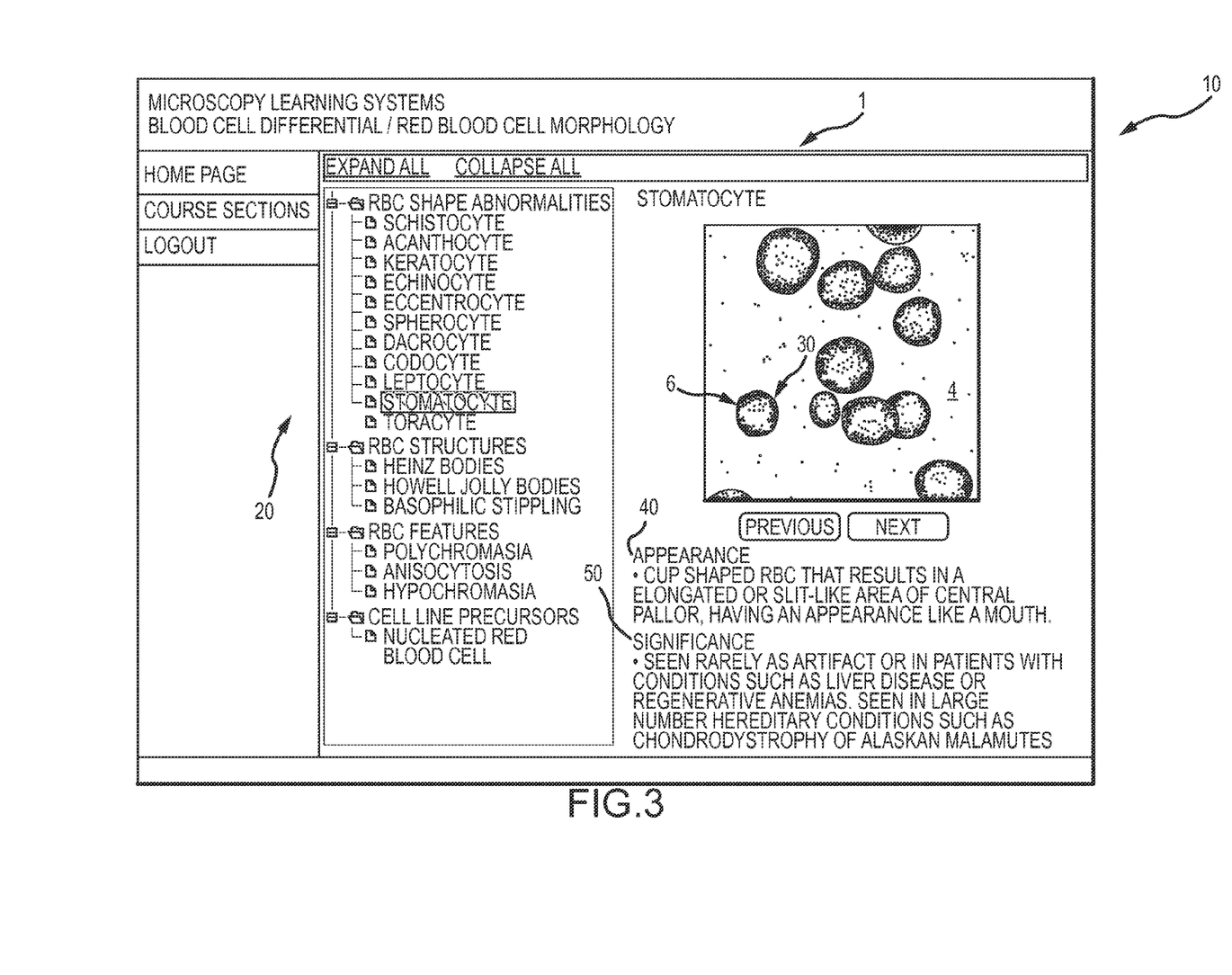
FIG. 3 is a plan view of an exemplary GUI showing a cell morphology category menu and an identified cell type with descriptive information related to the cell type.

In one embodiment, the functions may include at least one display function, detection function, navigation system function, comparison function, summary function, and information function. Referring now to FIGS. 1-3 simultaneously, the display function allows the system to display a list of cell morphology categories 2 (including white/red blood cell identification and white/red blood cell morphologies) in a drop down menu such as, for example, drop down menu 18 shown in FIG. 1 or expandable menu 20 shown in FIG. 3. A detection function is then capable of allowing the system to detect a selection of the cell morphology category 2 on the GUI 10 from a user. In response to the selection, the display function may provide digital slide image 4 related to the selected cell morphology category 2 displayed on the GUI 10 for the user to preview. The various cell types 6 may vary depending on the selected cell morphology category 2. For example, if the user selects a red blood cell shape abnormalities for the cell morphology category 2 from the drop down menu 18 then a second menu (not shown) may provide for cell types such as, for example, schistocytes, acanthocytes, kerotcytes, echinocytes, eccentrocytes, spherocytes, dacrocytes, codocytes, leptoctes, stomatocytes, or torocytes. Similarly, if the user selects red blood cell structures for the cell morphology category 2 from the drop down menu 18 then a second menu may provide for cell types such as, for example, Heinz bodies, Howell-Jolly bodies, or basophilic stippling. If the user selects red blood cell features for the cell morphology category 2 then the second menu may provide for cell types such as, for example, polychromasia, anisocytosis, or hypochromasia. If the user selects white blood cell structures for the cell morphology category 2 then the second menu may provide for cell types such as, for example, neutrophil, band, monocyte, lymphocyte, eosinophil, basophil, or nucleated red blood cell.

At least one navigation system function is capable allowing a user to manipulate the displayed digital slide image 4 by increasing or decreasing magnification or by scrolling to various portions 16 of the digital slide image 4. The navigation system function may provide a navigation system 5 displayed on GUI 10. The navigation system function may further allow a user to focus on a particular cell type 6 of interest. In one embodiment, the navigation system function includes creating a first virtual box of the image by obtaining a proportional top x and y coordinates and a proportional bottom x and y coordinates related to the digital slide image 4 and calculating pixels within the first virtual box—the number of pixels corresponding to a magnification level. The number of pixels may then be adjusted, relative to magnification levels, to allow a user to view the digital slide image 4 in focus. The navigation system function may label the coordinates as variables such as, for example, proptlx, proptly, propbrx, and propbry. The navigation system function is then capable of allowing a user to select a second virtual box within the first virtual box related to pixel size based on the pixel size of a second virtual box by calculating the top left x and y coordinates and the bottom right x and y coordinates of the second virtual box. The navigation system function accomplishes the calculation by obtaining the actual image size of the second virtual box related to x and y coordinates, multiplying or dividing it by the proportional x and y coordinates of the first virtual box, and adjusting the boundary conditions. The user may then zoom in or out on the digital slide image 4 using navigation system 5. The navigation system function may interact with a comparison function that compares a user's cell type selection to a database of annotations (id tags) related to cell types 6 and assigned to specific virtual boxes. For example, the comparison function may allow a user to select a cell type 6 for the second virtual box and have the selection checked against the database. Once checked, the display function may display the results on the GUI 10 in a summary box 24 as shown in FIG. 2. The comparison function may also allow the user to search for specific cell types 6 and receive instance feedback regarding the user's selections.

In another embodiment, the navigation system function is capable of providing for gallery capabilities to pan through digital slide image 4. For example, the detection function may allow a user to select portions of the digital slide image 4. As the user selects different portions, the navigation system orientates the selected portion of the digital slide image 4 relative to the entire digital slide image 4. Accordingly, specific areas and portions of the digital slide image 4 may be extracted and displayed.

The display function may also provide for various summaries regarding cell type 6 identifications on the digital slide image 4 of GUI 10. For example, the display function is capable of tracking a user's results over an extended period of time and display charts and graphs related to progress. In other embodiments, as shown in FIG. 3, the display function is capable of providing information related specifically to a selected cell type 6. For example, if a stomatocyte cell is shown on the GUI 10 then the display function may show cell information that discusses the significance of the stomatocyte and what conditions are usually associated with the stomatocyte. As shown in FIG. 3, the detection function is capable of detecting a user's selection of a specific cell type 6 (stomatocyte 30) from expandable menu 20 and then, in response to the selection, the display function may provide a digital slide image 4 of the cell type 6 (stomatocyte 30) and information such as, for example, the appearance 40 of the cell type 6 or the significance 50 of the cell type 6.

The display function is also capable of providing a selection menu 26 for a specific cell type 6, as shown in FIG. 2. The display function is capable of providing the selection menu 26 in response to various detection functions. For example, a user may use navigation system 5 to zoom in on a particular cell type 6 on digital slide image 4. The detection function may then recognize that the user is viewing a specific cell type 6 from the associated x and y coordinates. Once recognized, the detection function may signal the display function to display various cell types 6 in selection menu 26. The user may then select a cell type 6 from the selection menu 26. The comparison function may then compare the selected cell type 6 to the database of tagged cell types 6 within the specific x and y coordinates and signal if the user has made the right choice. The display function may then display results in summary box 24. Once the user is finished identifying cell types 6, the display function may compare the summary box 24 results to the predetermined number within the database.

Figure 4:
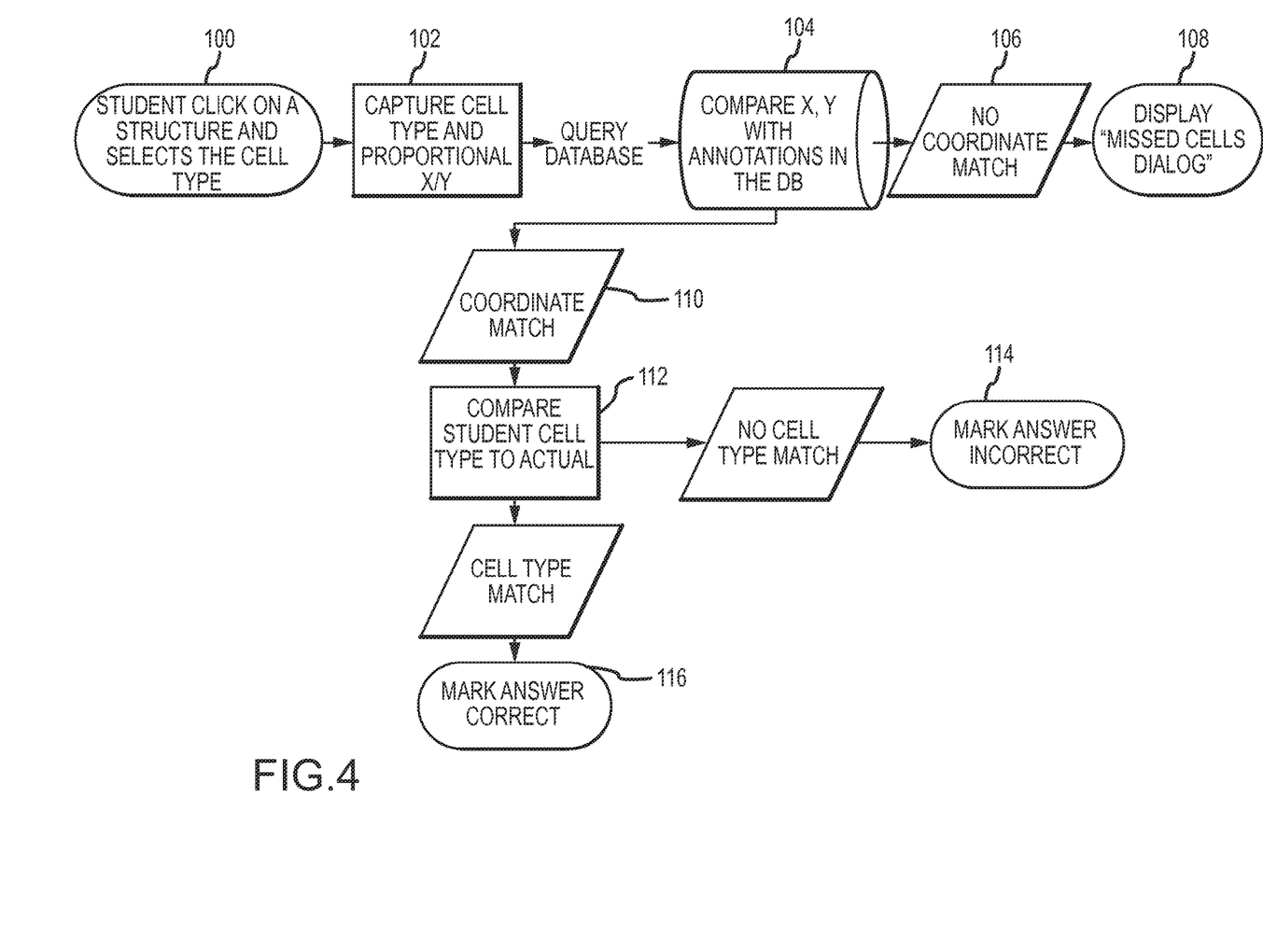
FIG. 4 is a flow diagram for an exemplary method of microscope-based learning.

Referring now primarily to FIG. 4, in one embodiment, a computer-implemented method for microscope-based learning includes providing a menu for a user to select 100 a specific cell morphology category 2 and cell type 6. Allowing the user to capture 102 and select a cell type 6 within proportional x and y coordinates. Comparing 104 the cell type 6 with annotations in the database. Determining 106 if the cell type 6 matches the annotations in the database within designated x and y coordinates. Displaying 108 a "missed cells dialog" box if the cell type 6 does not exist within the x and y coordinates. If the cell type 6 does exist within the x and y coordinates, determining 110 if the student has identified the correct cell type 6 by comparing 112 the identified cell type 6 with the database. Marking the users answer correct 114 or incorrect 116. Storing the results in a database and providing the results to a user.

A computer program also known as software, software application, script, or code used to provide the functionality related to GUI 10 and described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and system can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described. Furthermore, the flow diagrams disclosed herein have merely been presented as examples of manners in which the present teachings can be implemented and do not in all cases necessarily require all the disclosed steps and/or the particular order in which the steps have been presented.

In different embodiments, distributed computing environment may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

Having set forth the various embodiments of the present invention, it is anticipated that suitable modifications can be made which will nonetheless remain within the scope of the invention. The invention shall therefore only be construed in accordance with the following claims.

What is claimed is:

1. A system, comprising:
   a display screen;
   one or more processors;
   memory; and
   one or more programs, wherein the one or more programs are stored in the memory and configured to be executed by the one or more processors, the one or more programs including instructions for:
   displaying, in a first area of the display screen, a list of cell morphology categories;
   detecting a first selection in the first area of the display screen corresponding to the list of cell morphology categories;
   creating a preview area in a second area of the display screen that is separate from the first area, in response to the first selection;
   displaying, in the second area of the display screen, an image corresponding to the first selection of the list of cell morphology categories;
   displaying, in the second area of the screen display, a list of cell types related to the first selection of the list of cell morphologies;
   displaying, in the second area of the screen display, a navigation system for increasing or decreasing magnification of the image in the second area of the display screen corresponding to the first selection of the list of cell morphology categories;

detecting a first virtual box associated with the navigation system;

detecting a second selection in the second area of the display screen corresponding to the list of cell types;

automatically determining if the second selection matches a predetermined cell type within the first virtual box from a database; and displaying information related to the second selection in the first area of the display screen corresponding to the list of cell types.

2. The system of claim 1, wherein the first virtual box comprises proportional top x and y coordinates and a proportional bottom x and y coordinates related to the second area of the display screen.

3. The system of claim 2, wherein the first virtual box comprises pixels wherein the number of pixels in the first virtual box correspond to a magnification level.

4. The system of claim 3, wherein the number of pixels are adjusted, relative to the magnification levels, to focus the second area of the display screen.

5. The system of claim 1, wherein the list of cell morphology categories comprises red blood cell morphology, red blood cell shape abnormalities, red blood cell structures, red blood cell features, white blood cell morphology, and white blood cells.

6. The system of claim 1, wherein the list of cell types comprises schistocytes, acanthocytes, kerotcytes, echinocytes, eccentrocytes, spherocytes, dacrocytes, codocytes, leptocytes, stomatocytes, torocytes, Heinz bodies, Howell-Jolly bodies, basophilic stippling, polychromasia, anisocytosis, hypochromasia, neutrophil, band, monocyte, lymphocyte, eosinophil, basophil, and nucleated red blood cell.

7. A computer-implemented method for microscope-based learning, comprising:

providing a first menu on a GUI to allow a user to identify a cell category of interest on a digital slide image that is simultaneously displayed with the first menu on the GUI;

providing a navigation system to allow the user to navigate the digital slide image and select proportional x and y coordinates on the digital slide image;

providing a second menu on the GUI to allow the user to identify a cell type for the selected proportional x and y coordinates;

automatically determining if the cell type identified by the user matches a predetermined cell type within the x and y coordinates from a database;

indicating whether the identified cell type matches the predetermined cell type on the GUI; and displaying a summary of the total matches on the GUI.

8. The computer-implemented method of claim 7, wherein the navigation system comprises a first virtual box on the digital slide image.

9. The computer-implemented method of claim 8, wherein the first virtual box comprises proportional top x and y coordinates and a proportional bottom x and y coordinates related to the digital slide image.

10. The computer-implemented method of claim 9, wherein the first virtual box comprises pixels related to the digital slide image and the number of pixels in the first virtual box correspond to a magnification level.

11. The computer-implemented method of claim 10, wherein the number of pixels are adjusted, relative to the magnification levels, to focus the second area of the digital slide image.

12. The computer-implemented method of claim 7, wherein the first menu allows the user to identify the cell category from a list comprising red blood cell morphology, red blood cell shape abnormalities, red blood cell structures, red blood cell features, white blood cell morphology, and white blood cells.

13. The computer-implemented method of claim 7, wherein the second menu allows the user to identify the cell type from a list comprising schistocytes, acanthocytes, kerotcytes, echinocytes, eccentrocytes, spherocytes, dacrocytes, codocytes, leptocytes, stomatocytes, torocytes, Heinz bodies, Howell-Jolly bodies, basophilic stippling, polychromasia, anisocytosis, hypochromasia, neutrophil, band, monocyte, lymphocyte, eosinophil, basophil, and nucleated red blood cell.

14. A computer-implemented method for microscope-based learning, comprising:

providing a first menu on a GUI to allow a user to select a structure of interest on a digital slide image simultaneously displayed on the GUI;

providing a navigation system on the GUI to allow the user to navigate the digital slide image and select a first virtual box on the digital slide image;

providing a second menu on the GUI to allow the user to select a cell type corresponding to the structure;

automatically determining if the cell type selected by the user matches a predetermined cell type within the virtual box from a database;

automatically displaying at least one cell on the GUI matching the selected cell type; and displaying information related to the cells simultaneously on the GUI.

15. The computer-implemented method of claim 14, wherein the first virtual box comprises proportional top x and y coordinates and a proportional bottom x and y coordinates related to the digital slide image.

16. The computer-implemented method of claim 15, wherein the first virtual box comprises pixels related to the digital slide image and the number of pixels in the first virtual box correspond to a magnification level.

17. The computer-implemented method of claim 14, wherein the first menu allows the user to identify the structure of interest from a list comprising red blood cell morphology, red blood cell shape abnormalities, red blood cell structures, red blood cell features, white blood cell morphology, and white blood cells.

18. The computer-implemented method of claim 14, wherein the second menu allows the user to identify the cell type from a list comprising schistocytes, acanthocytes, kerotcytes, echinocytes, eccentrocytes, spherocytes, dacrocytes, codocytes, leptoctes, stomatocytes, torocytes, Heinz bodies, Howell-Jolly bodies, basophilic stippling, polychromasia, anisocytosis, hypochromasia, neutrophil, band, monocyte, lymphocyte, eosinophil, basophil, and nucleated red blood cell.

* * * * *